US012629547B2

(12) United States Patent
Michael et al.

(10) Patent No.: US 12,629,547 B2
(45) Date of Patent: May 19, 2026

(54) LANYARD DETECTION SYSTEM

(71) Applicant: Altec Industries, Inc., Birmingham, AL (US)

(72) Inventors: Joseph William Michael, Cameron, MO (US); Jonathan Westin Sykes, Gower, MO (US); Timothy J. Mourlam, Shawnee, KS (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/980,149

(22) Filed: Dec. 13, 2024

(65) Prior Publication Data

US 2026/0097245 A1 Apr. 9, 2026

Related U.S. Application Data

(63) Continuation of application No. 18/908,012, filed on Oct. 7, 2024.

(51) Int. Cl.

| | |
|---|---|
| ***A62B 35/00*** | (2006.01) |
| ***B66F 11/04*** | (2006.01) |
| ***B66F 17/00*** | (2006.01) |

(52) U.S. Cl.

CPC ........ *A62B 35/0037* (2013.01); *B66F 11/046* (2013.01); *B66F 17/006* (2013.01)

(58) Field of Classification Search

CPC .... A62B 35/0037; B66F 11/04; B66F 11/042; B66F 11/044; B66F 11/046; B66F 17/006

See application file for complete search history.

(56) References Cited

U.S. PATENT DOCUMENTS

| | | | | |
|---|---|---|---|---|
| 4,456,093 | A * | 6/1984 | Finley | B66F 11/046 182/2.11 |
| 6,265,983 | B1 * | 7/2001 | Baillargeon | B66F 11/044 340/687 |
| 9,149,670 | B1 * | 10/2015 | Walker | A62B 35/0043 |
| 9,245,434 | B2 * | 1/2016 | Baillargeon | G08B 25/08 |
| 9,776,847 | B2 * | 10/2017 | Mondal | G07C 5/0808 |
| 10,138,102 | B2 * | 11/2018 | Baillargeon | B66F 17/006 |
| 10,810,851 | B2 * | 10/2020 | Baillargeon | B66F 11/04 |
| 11,192,765 | B1 | 12/2021 | Featherstone et al. | |
| 11,235,185 | B1 * | 2/2022 | Truesdell | A62B 35/0075 |
| 11,247,080 | B2 * | 2/2022 | Al-Rasheed | A62B 35/0025 |

(Continued)

FOREIGN PATENT DOCUMENTS

EP 4230571 A1 8/2023

OTHER PUBLICATIONS

Another Lanyard Detection Device, Vertikal Days 2024, Dec. 6, 2023, www.Vertikal.net.

BT 60 Fasten Tracker-Altec, Fasten Tracker Lanyard Attachment Monitoring System for ALTEC Non-Insulated Bucket Trucks/ Fiberglass Basket, vZ4031 Or 1, OEM Data Delivery, pp. 1-4, www.oemdd.com.

(Continued)

*Primary Examiner* — Daniel P Cahn
*Assistant Examiner* — Shiref M Mekhaeil
(74) *Attorney, Agent, or Firm* — Erise IP, P.A.

(57) ABSTRACT

Systems, methods, devices, and computer-readable media for lanyard detection applications. A lanyard attachment assembly may include a moveable element configured to be displaced in response to attachment of a lanyard device such that one or more sensors detect the attachment. In response to one or more operator inputs, an alert may be generated if determined that a lanyard device is not attached.

19 Claims, 8 Drawing Sheets

(56) References Cited

U.S. PATENT DOCUMENTS

| | | | | | |
|---|---|---|---|---|---|
| 11,472,685 | B1 | 10/2022 | Thompson et al. | | |
| 11,745,035 | B2 * | 9/2023 | Sepe | G08B 25/016 | 182/18 |
| 2010/0231402 | A1 * | 9/2010 | Flynt | G08B 19/00 | 340/679 |
| 2011/0090079 | A1 * | 4/2011 | Morino | A62B 35/0075 | 340/532 |
| 2012/0217091 | A1 * | 8/2012 | Baillargeon | G08B 21/02 | 182/18 |
| 2015/0027808 | A1 * | 1/2015 | Baillargeon | A62B 35/0025 | 182/19 |
| 2015/0217981 | A1 * | 8/2015 | Baillargeon | B66F 17/006 | 182/2.8 |

OTHER PUBLICATIONS

BT60ni Fasten Tracker, OEM Data Delivery, https://solutions.oemcontrols.com/bt60ni-spec-sheet-download? hstc=20702567.2d261bf398d4f5a2c738c6c67baef632.1723582649138.1723582649138.1723582649138.1&_hssc=20702567.1.1723582649138&_hsfp=4037359970&hsCtaTracking=45fd89c9-b2f9-4c22-bf1f-895a182060ae%7C012922e6-e45e-4e02-ad32-a85f7d974f33.

Kphillips, How to Stay Safe with Altec's Lanyard Detection System, Altec Inc., Month: May 2021.

Nationwide Starts Installing Harness Device, Vertikal Days 2024, May 25, 2023, www.Vertikal.net.

Nifty Harness Attachment Sensor, Vertikal Days 2024, Mar. 15, 2023, www.Vertikal. net.

European Patent Application 25206528.9, Extended Search Report, issued Feb. 9, 2026.

* cited by examiner

LANYARD DETECTION SYSTEM

RELATED APPLICATIONS

This patent application is a continuation application claiming priority benefit, with regard to all common subject matter, of U.S. patent application Ser. No. 18/908,012, filed Oct. 7, 2024, and entitled "LANYARD DETECTION SYSTEM." The above referenced patent application is hereby incorporated by reference in its entirety into the present application.

BACKGROUND

1. Field

Embodiments of the present disclosure relate to lanyard detection. More specifically, embodiments of the present disclosure relate to lanyard detection systems for an aerial device.

2. Related Art

Standard aerial devices may provide lanyard attachment devices at utility platforms such that operators may attach themselves to the utility platform via a lanyard safety device. Said lanyard safety device provides a mechanism that, in a situation where the operator may fall from the utility platform, slows the operator to a stop such that the operator does not fall to the ground. However, standard lanyard attachment detection systems typically include complex mechanical and electrical components, produce unnecessary alerts that bombard and annoy occupants, and are prone to tiedown workaround schemes such that an operator is able to intentionally or inadvertently avoid proper lanyard attachment.

SUMMARY

Embodiments of the present disclosure solve the above-mentioned problems by providing a lanyard attachment system with a simple detection assembly comprising a moveable element and one or more sensors operable to detect displacement of the moveable element responsive to attachment of a lanyard device. Further, embodiments of the present disclosure provide an efficient alert implementation in which alerts are generated, at least in part, responsive to occupant input such that alerts may only be generated when movement or action is requested.

In some aspects, the techniques described herein relate to a system for detecting an attachment of a lanyard device at a utility platform of an aerial device, the system including: an input device that receives occupant input; a lanyard attachment assembly operable to receive a lanyard device, the lanyard attachment assembly including: a fixed element; a moveable element; and an attachment sensor connected to the moveable element that detects a state of the moveable element, wherein the moveable element is in a first state when the lanyard device is not attached to the lanyard attachment assembly and the moveable element is in a second state when the lanyard device is attached to the lanyard attachment assembly; and a controller operable to performing at least one action in response to one or more signals received from the input device and the attachment sensor.

In some aspects, the techniques described herein relate to one or more non-transitory computer-readable media storing computer-executable instructions that, when executed by at least one processor, perform a method of detecting an attachment of a lanyard device on a utility platform, the method including: receiving an operator input from an input device; receiving an attachment signal indicative of the attachment of the lanyard device to a lanyard attachment assembly of the utility platform using an attachment sensor, wherein the attachment sensor detects a state of a moveable element of the lanyard attachment assembly, wherein the moveable element is in a first state when the lanyard device is not attached to the lanyard attachment assembly and the moveable element is in a second state when the lanyard device is attached to the lanyard attachment assembly; and generating an alert in response to at least one of the operator input and the attachment signal.

In some aspects, the techniques described herein relate to a lanyard attachment assembly for detecting an attachment of a lanyard device at a utility platform of an aerial device, the lanyard attachment assembly operable to receive a lanyard device, and the lanyard attachment assembly including: a controller; a communication connection to an input device disposed on or in the utility platform that receives occupant input; an additional communication connection to a control system of the aerial device; a fixed element; a moveable element; and an attachment sensor connected to the moveable element that detects a state of the moveable element, wherein the moveable element is in a first state when the lanyard device is not attached to the lanyard attachment assembly and the moveable element is in a second state when the lanyard device is attached to the lanyard attachment assembly, and wherein the controller is operable to prevent one or more operations of the control system in response to one or more signals received from the input device and the attachment sensor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
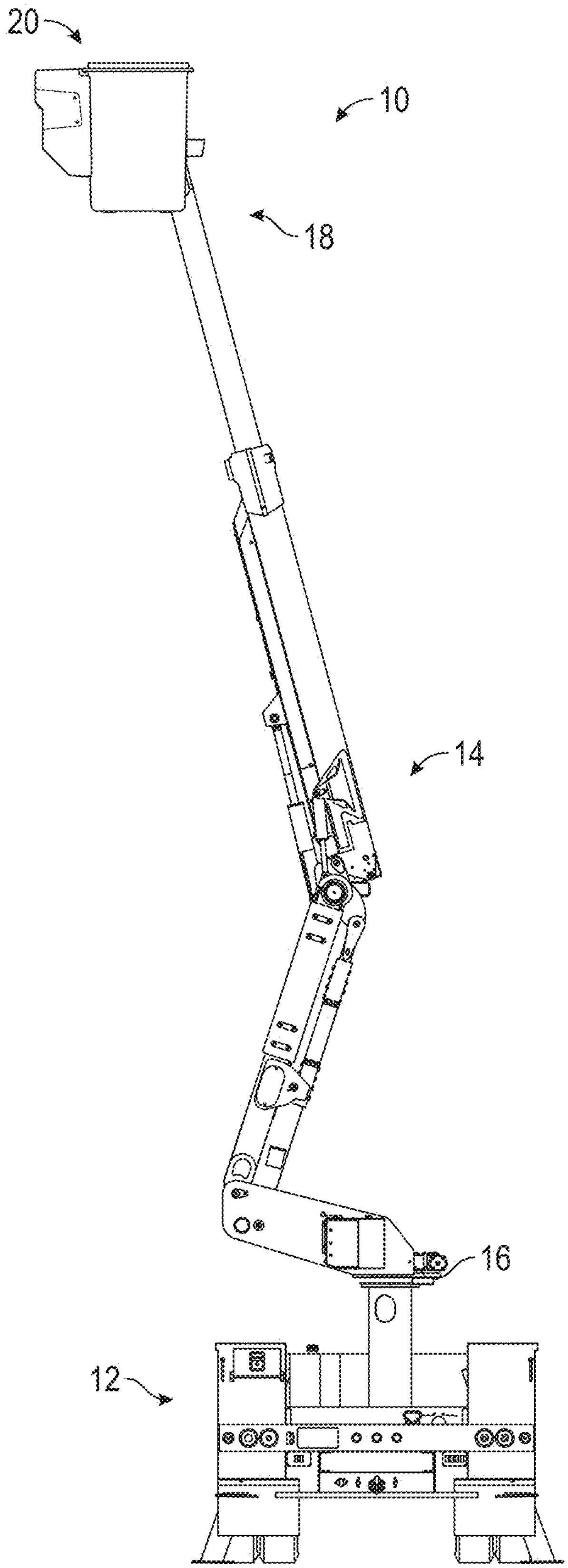
FIG. 1 illustrates an exemplary aerial device relating to some embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure contemplate a lanyard attachment system operable to detect attachment of a lanyard device and efficiently alert an operator in response to an attachment condition. In some embodiments, unnecessary alerts are prevented by generating the alert responsive to one or more operator inputs, for example, such that the alert is only generated if an input requesting platform motion is received. In some embodiments, a moveable element is used, such as, for example, a compliant spring steel structure configured to be displaced in response to attachment of a lanyard device. Further, one or more attachment sensors, such as, for example, one or more reed switches are included such that a proximity of magnetic components on the moveable element is detected to determine attachment, as described in further detail below. Further still, embodiments are contemplated in which alerts may be generated in response to an occupancy of a utility platform. For example, a number of occupants may be determined, and a corresponding number of lanyard attachments is checked.

FIG. 1 illustrates an exemplary aerial device 10 relating to some embodiments of the present disclosure. Aerial device 10 may be attached to utility vehicle 12, as shown. In some embodiments, aerial device 10 comprises boom assembly 14, upper boom section 18, and utility platform 20. Additionally, aerial device 10 comprises turntable 16 disposed on utility vehicle 12, as shown. As aerial device 10 is operated near electrically powered cables, in some embodiments, utility platform 20 and boom assembly 14 comprise insulating material for insulating aerial device 10. Furthermore, any electrical components disposed in the utility platform and on boom assembly 14 may be self-contained and separate from the electrical components of utility vehicle 12. As such, a dielectric gap is created between utility platform 20 and utility vehicle 12. In some embodiments, utility vehicle 12 may generally be referred to as a base, and may be any of a vehicle, a crane, a platform, a truck bed, a mechanical tree trimming apparatus, a hydraulic lift, or any other base capable of supporting boom assembly 14 and utility platform 20.

In some embodiments, an operator may be positioned in utility platform 20 for performing work on or near high-power lines. The operator may access upper controls disposed on utility platform 20 as well as hydraulic tools for performing the work. In some embodiments, the operator in utility platform 20 may move to various positions using the upper controls. Furthermore, lower controls may be utilized at the base of aerial device 10 such as at utility vehicle 12 and at turntable 16. The operator may utilize a lanyard to prevent the operator from falling to the ground if the operator falls from utility platform 20 while performing the work. The lanyard detection unit described in embodiments herein may limit operations of aerial device 10 and provide warnings to the operator and to any ground crew of the state of aerial device 10 and the state of the lanyard detection unit.

Figure 2:
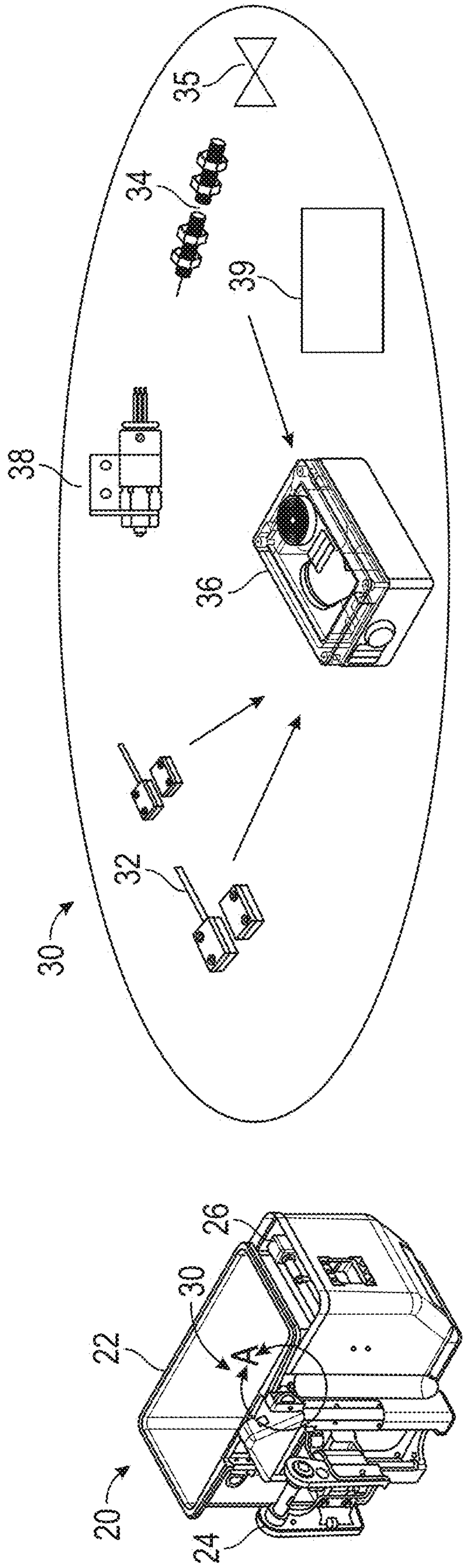
FIG. 2 illustrates an exemplary view of utility platform relating to some embodiments.

FIG. 2 illustrates an exemplary view of utility platform 20 relating to some embodiments. The utility platform 20 comprises one or more platform walls 22, as shown. Additionally, in some embodiments, the utility platform 20 comprises a boom coupling 24 that couples the utility platform 20 to a distal end of the upper boom section 18. In some embodiments, the boom coupling 24 provides a rotatable connection with the boom assembly 14.

In some embodiments, an input device 26 is included. The input device 26 may be mounted to or coupled to the utility platform 20. For example, in some embodiments, the input device 26 is mounted to the one or more platform walls 22 or mounted within a platform pocket disposed external to the platform wall 22, as shown. The input device 26 may be operable to receive operator inputs for controlling motion of the utility platform 20 or other portions of the boom assembly 14. In some embodiments, the input device 26 comprises a control input apparatus similar to as described in U.S. Pat. No. 11,822,356, titled "AERIAL LIFT SYSTEMS AND CONTROL INPUT APPARATUSES WITH HIGH ELECTRICAL RESISTANCE FOR USE WITH AERIAL LIFT SYSTEMS", filed Jan. 30, 2023, which is hereby incorporated by reference in its entirety into the present disclosure.

In some embodiments, a lanyard detection system 30 is included. The lanyard detection system 30 may be mounted on a portion or multiple portions of the utility platform 20, such as, at the area denoted by 'A', as shown. However, it should be understood that, in some embodiments, one or more components of the lanyard detection system 30 are disposed at other locations on or off the utility platform 20. Components of the lanyard detection system 30 are depicted separated from the utility platform 20. In some embodiments, the lanyard detection system 30 comprises at least one attachment sensor 32 that is operable to detect an attachment of a lanyard device to an attachment assembly. In some embodiments, the attachment assembly is disposed on the utility platform 20, as will be described in further detail below.

In some embodiments, the lanyard detection system 30 comprises at least one interlock sensor 34. In some embodiments, the interlock sensor 34 is configured to detect an interlock state associated with the input device 26. For example, embodiments are contemplated in which the interlock sensor 34 detects actuation or activation of the input device 26 such as if the input device 26 is in an active operational state. In some embodiments, the active operation state is associated with an upper control state of the boom assembly 14, in which motion of the boom assembly 14 and platform 20 are controlled using upper controls associated with the utility platform 20, such as the input device 26, as opposed to lower controls disposed at or near the utility vehicle 12.

In some embodiments, at least one hydraulic blocking valve 35 is included. The hydraulic blocking valve 35 may be operable to prevent one or more operations associated with the platform 20, such as platform/boom movement in response to one or more signals detected by the lanyard detection system 30. The hydraulic blocking valve 35 may be operable to disable inputs to an input device of the utility platform 20, such as, the input device 26. In some embodiments, the hydraulic blocking valve 35 comprises a low-power hydraulic solenoid valve coupled to a hydraulic circuit of the utility platform such that the hydraulic blocking valve 35 is operable to block hydraulic flow to at least a portion of the hydraulic circuit. In some embodiments, the hydraulic blocking valve 35 is a low power device that operates, for example, on current within the microamp range.

In some embodiments, a controller 36 is included, which may be included within the lanyard detection system 30 or is otherwise coupled to the lanyard detection system 30. For example, in some embodiments, the lanyard detection system 30 includes the controller 36 operable to control portions of the lanyard detection system 30. The controller 36 may be communicatively coupled to the at least one attachment sensor 32 and the interlock sensor 34. For example, in some embodiments, the controller 36 comprises a plurality of communication connections to other devices associated with the lanyard detection system 30, as well as other components of the aerial device 10.

In some embodiments, the lanyard detection system 30 further includes at least one pressure sensor 38. For example, the at least one pressure sensor 38 may comprise a pressure switch operable to detect a pressure associated with the upper controls. In some embodiments, the pressure sensor 38 detects an operational state of the upper controls, as well as a state associated with damage or tampering with a lanyard attachment structure. For example, the pressure sensor 38 may include a pressure switch that detects a tie down state to determine if the lanyard detection system 30 is tied down without proper lanyard attachment. Additionally, the pressure switch may detect damage to the lanyard attachment structure. Further, in some embodiments, the pressure sensor 38 may be configured to detect an upper control status as well as a condition of the moveable element 44. For example, the pressure sensor 38 may detect an activation of one or more hydraulic lines associated with the upper controls.

In some embodiments, the pressure sensor 38 is used as a power on switch for the lanyard detection system. For example, the system may be placed in an "off" or passive state until a pressure above a predetermined threshold is sensed, which causes the system to be placed into an "on" or active state. Alternatively, in some embodiments, other suitable "power on" switches or triggers are contemplated. For example, the lanyard detection system may be activated responsive to any of a presence of fiber optic light from a fiber optic communication line, a manual switch, such as a switch or control of an input device, an electromagnetic switch coupled to a user's interlock switch, or other suitable activation techniques, as well as combinations thereof.

In some embodiments, the lanyard detection system 30 includes or is otherwise coupled to a power source 39. For example, the power source 39 may include a battery or other suitable electrical power source such as, a capacitor, as well as other non-electrical power sources such as a hydraulic power source, or pneumatic power source configured to provide power to components of the utility platform 20 including the lanyard detection system 30. In some embodiments, the power source 39 comprises a battery mounted or disposed in a portion of the utility platform 20, such as on the utility platform wall 22. Further, in some embodiments, the power source 39 comprises a standalone power source coupled to or mounted within the controller 36. For example, in some embodiments, the power source 39 comprises a battery mounted within a housing of the controller 36.

Figure 3A:
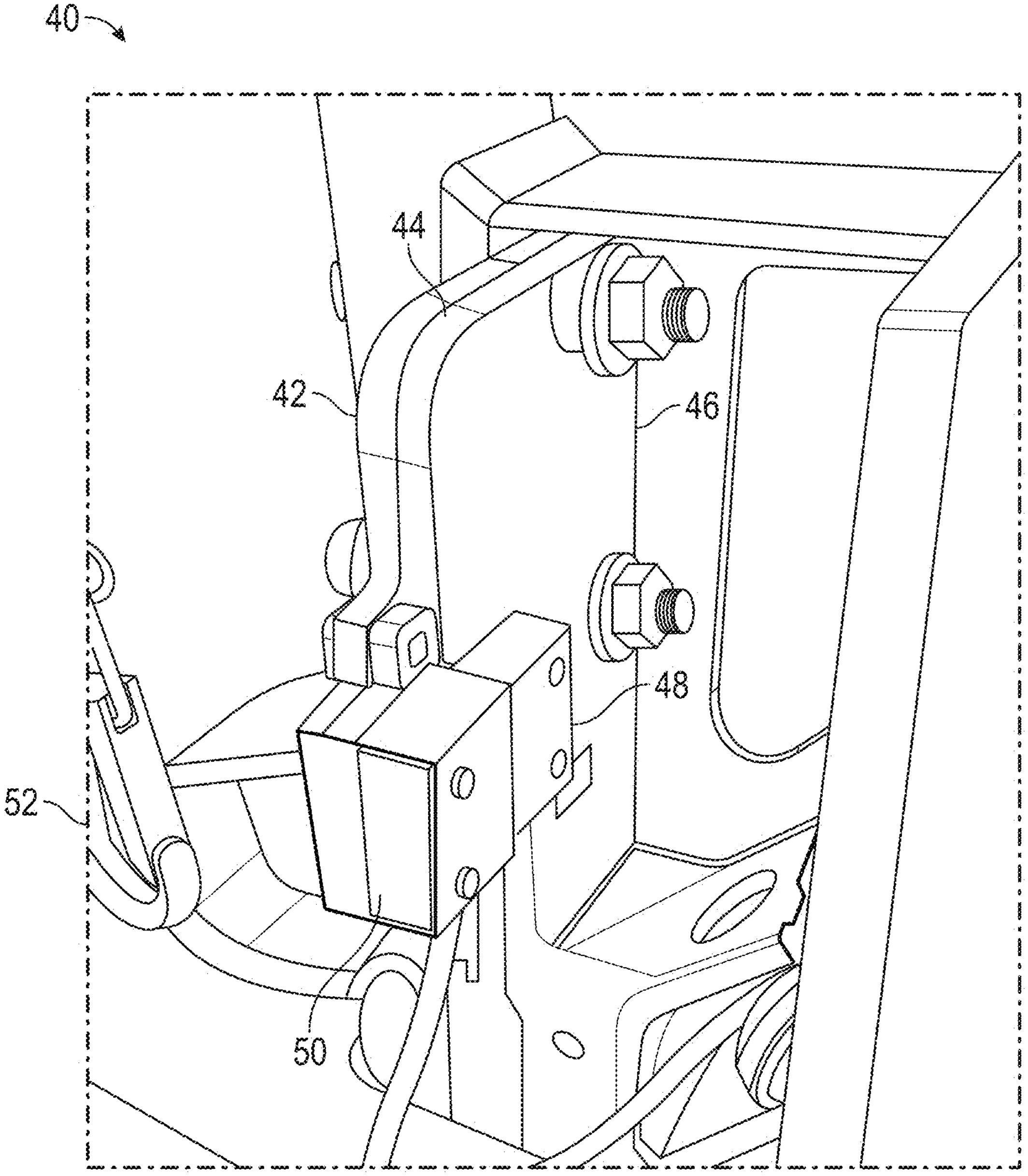
FIG. 3A illustrates an exemplary lanyard attachment assembly in an unattached state relating to some embodiments of the present disclosure.

FIG. 3A illustrates an exemplary lanyard attachment assembly 40 in an unattached state relating to some embodiments of the present disclosure. The lanyard attachment assembly 40, or portions thereof, may be disposed on the utility platform 20. For example, in some embodiments, the lanyard attachment assembly 40 is mounted on a utility platform wall 22 of the utility platform 20, such that an operator standing in the utility platform 20 is able to attach a lanyard safety device to a portion of the lanyard attachment assembly 40.

In some embodiments, the lanyard attachment assembly 40 includes an attachment plate 42 that provides a lanyard attachment point. The lanyard attachment assembly 40 further includes a moveable element 44, also referred to as a lanyard door, that is configured to be displaced while in an attached state. For example, the moveable element 44 may be coupled to a compliant hinge component 46 such that the moveable element 44 swings into an open position while the lanyard attachment assembly 40 is in an attached state. The compliant hinge component 46 may be mounted to the utility platform 20, for example, through coupling via one or more bolts or other fasteners, as shown. In some embodiments, the moveable element 44 is configured to be biased into a closed position while the lanyard attachment assembly 40 is in an unattached state. For example, the moveable element 44 may be biased into the closed position by coupling with the compliant hinge 46.

The lanyard attachment assembly 40 may include a magnetic component 48 disposed on a portion of the moveable element 44. Additionally, a magnetic sensor 50, such as a magnetic reed switch may be disposed on the attachment plate 42 or another fixed portion of the lanyard attachment assembly 40. In some embodiments, the magnetic component 48 includes a permanent magnet or a magnetically sensible element capable of being detected by the magnetic sensor 50. Further, in some embodiments, other arrangements of magnetic sensing are contemplated. For example, embodiments are contemplated in which the magnetic component 48 is disposed at a fixed point on the lanyard attachment assembly 40 and the magnetic sensor 50 is disposed on the moveable element 44.

Figure 3B:
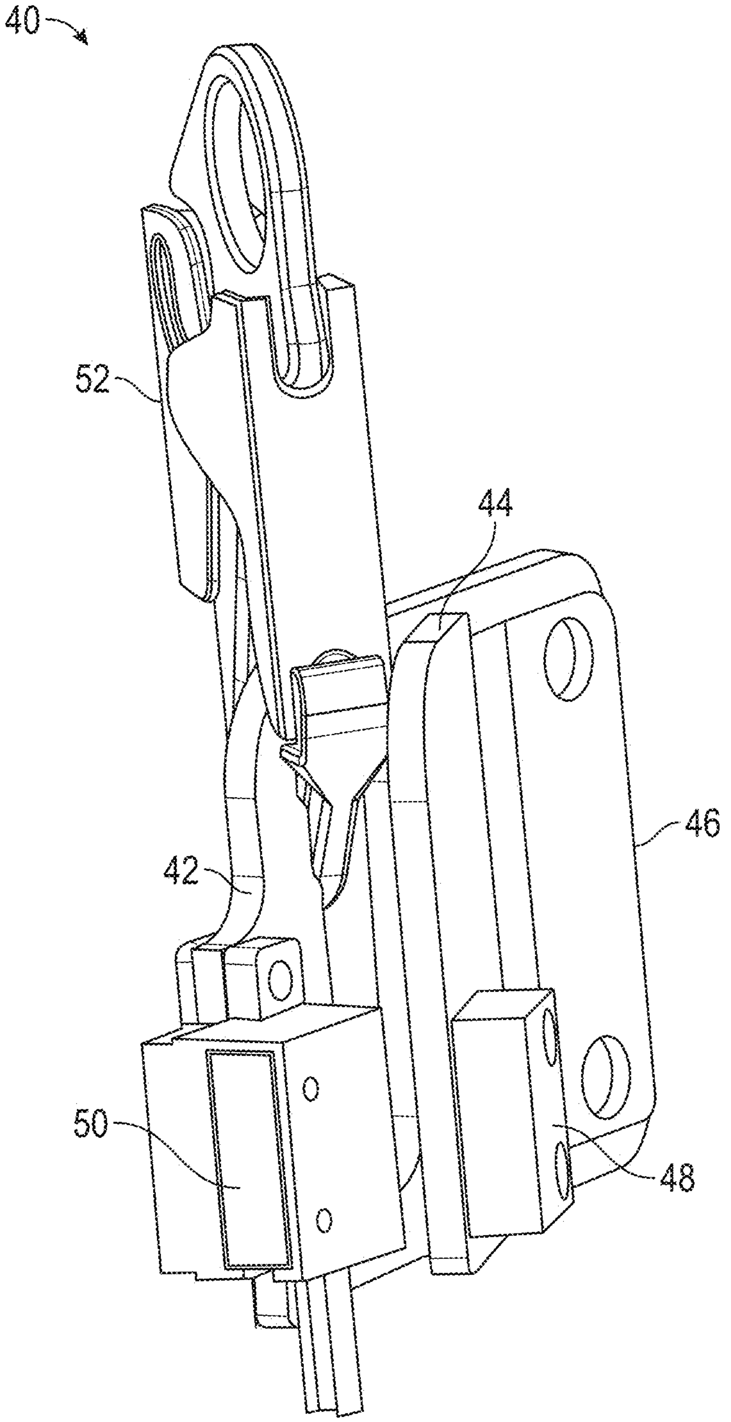
FIG. 3B illustrates the exemplary lanyard attachment assembly in an attached state relating to some embodiments of the present disclosure.

In some embodiments, the attachment plate 42 is configured to receive a lanyard device 52. For example, the attachment plate 42 may comprise one or more openings such that a lanyard clip may be disposed therethrough to removably attach the lanyard device 52 to the lanyard attachment assembly 40. In some embodiments, the attachment plate 42 comprises a D-shaped opening or a rounded slot-shaped opening providing a suitable space for receiving the lanyard device 52. Further, in some embodiments, the moveable element 44 may comprise a similar geometric profile to that of the attachment plate 42. However, it should be understood that the moveable element 44 or lanyard door, may not include an opening such that the lanyard device 52 cannot extend through the moveable element 44 and instead, causes the moveable element 44 to be displaced while in an attached state, as shown in FIG. 3B. For example, both of the attachment plate 42 and the moveable element 44 may comprise a substantially rectangular outer profile with one or more rounded edges, as shown.

In some embodiments, the compliant hinge component 46 comprises a semi-elastic material configured to provide compliant motion responsive to lanyard attachment but suitable rigidity such that the moveable element 44 is biased into a closed position. For example, in some embodiments, the compliant hinge component 46 (or moveable element 44) comprises a spring steel material with a relatively high yield strength such that the moveable element 44 returns to the closed position responsive to removal of the lanyard device 52. Spring steel materials such as low-alloy manganese, medium-carbon steel, or high-carbon steel are contemplated as exemplary spring steel alloys. In some embodiments, other suitable compliant materials may be used such as, for example, other metals and metal alloys, polymers, and composites.

Further, in some embodiments, additional devices and components may be used to bias the moveable element into the closed position. For example, in some embodiments, a spring or elastic cord may be used to bias the moveable element 44 into the closed position. In some such embodiments, a spring element may be disposed between an external surface of the moveable element and a fixed element on a side opposite the attachment plate 42 such that the spring acts against the moveable element 44 to push the moveable element 44 towards the attachment plate 42 (and into contact with the attachment plate 42 in the unattached state). In some embodiments, any of torsion springs, or linear springs may be used, as well as combinations thereof.

FIG. 3B illustrates the exemplary lanyard attachment assembly 40 in an attached state relating to some embodiments of the present disclosure. While in the attached state, the moveable element 44 or lanyard door is in an opened position in which the door is pried open by the presence of the lanyard device 52 within the opening of the attachment plate 42, as shown. Here, the lanyard device 52 pushes against the moveable element 44, such that the moveable element 44 deflects, for example, at the compliant hinge 46 and moves in a direction opposite the biasing direction of the compliant hinge 46 and away from the fixed attachment plate 42.

While in the attached state, displacement of the moveable element 44 moves the magnetic component 48 out of range of the magnetic sensor 50. For example, in some embodiments, the magnetic sensor 50 comprises a reed switch that is in a closed state while the lanyard attachment assembly 40 is in the unattached state, but enters an open state responsive to attachment of the lanyard device 52 displacing the moveable element 44 such that the magnetic component 48 is moved away from the magnetic sensor 50.

In some embodiments, anti-tie-down logic is used to detect a tie down state of the lanyard detection system 30 and lanyard attachment assembly 40. For example, the anti-tie-down logic may perform an initial tie down check at startup of the system to determine whether the lanyard attachment assembly is permanently modified into an attached state. Additionally, or alternatively, in some embodiments, the anti-tie-down logic is based on detecting that a lanyard device is attached or the moveable element 44 is in the attached state while an operator is not present within the utility platform 20. Further still, other anti-tie-down techniques are contemplated to prevent false positive lanyard attachment conditions. For example, anti-tie-down logic may detect errors or malfunctions within the control system and sensors of the lanyard detection system 30. Here, an anti-tie-down check may be performed to determine whether one or more switches and/or sensors are malfunctioning or physically tied down/altered.

In some embodiments, a tie down alert is contemplated. For example, the audible indicator 56 and visual indicator 58 may be configured to provide a specific alert in response to a tie down condition being detected. In some embodiments, one or more operations of the boom assembly 14 may be prevented responsive to detection of a tie down condition.

Figure 4:
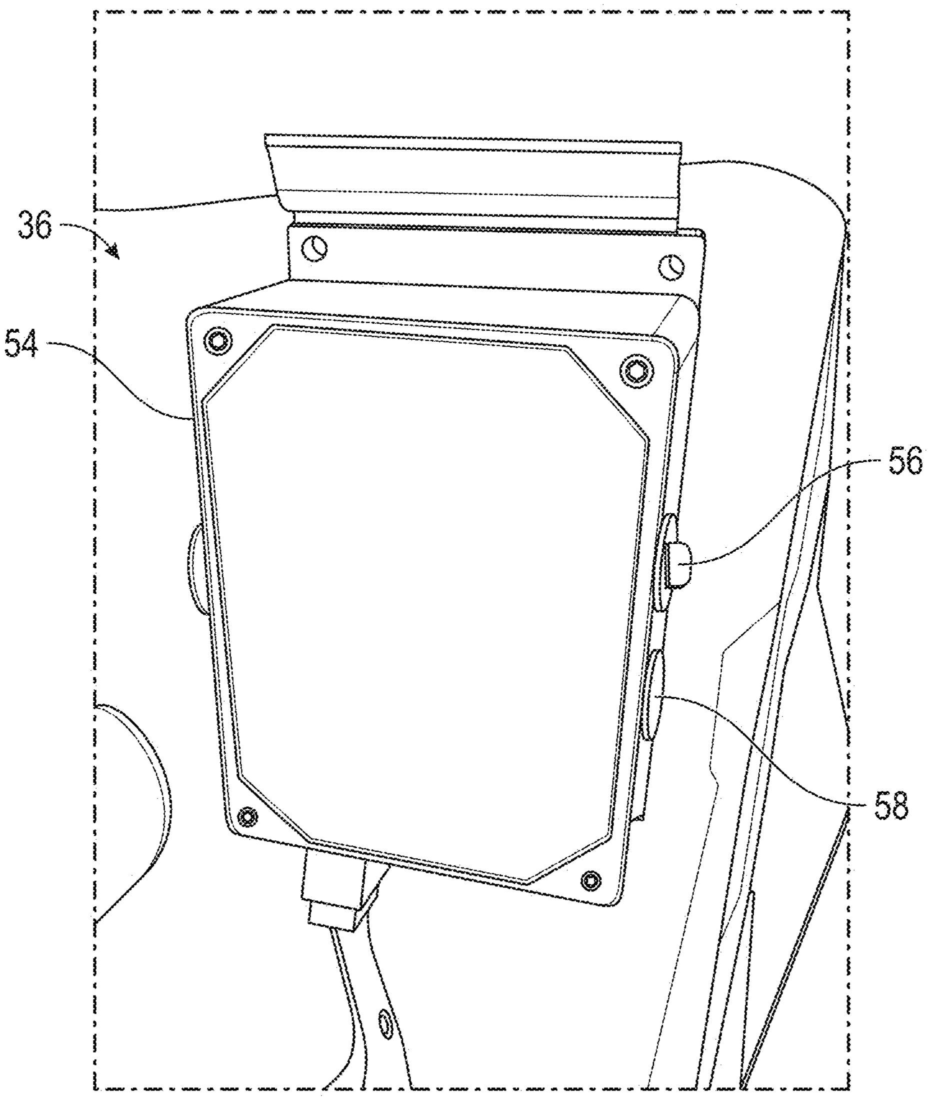
FIG. 4 illustrates an exemplary controller relating to some embodiments of the present disclosure.

FIG. 4 illustrates an exemplary controller 36 relating to some embodiments of the present disclosure. In some embodiments, the controller 36 comprises a control box with a housing 54 covering one or more internal components of the controller 36. For example, in some embodiments, at least one processor and at least one computer-readable storage element may be included within an internal portion of the controller 36. The at least one computer-readable storage element may include one or more non-transitory computer readable media stored thereon that contain computer executable instructions that, when executed by the at least one processor perform a method of detecting lanyard attachment.

In some embodiments, the controller 36 is coupled to or includes one or more indicator device configured to alert an operator of a lanyard attachment state. In some embodiments, the controller 36 includes an audible indicator 56 and a visual indicator 58 disposed on an external surface of the housing 54. The audible indicator 56 may include one or more speakers mounted on and coupled to the controller 36. The one or more speakers may be configured to produce an audible alarm or other audible feedback to alert or inform the operator of a state of the lanyard attachment assembly 40. The visual indicator 58 may include one or more light emitting diodes (LEDs), one or more displays, or other forms of lighting configured to produce a visual indication such as any of a flashing light, a color-specific light pattern, or other lighting pattern for visual detection by the operator. As an example, embodiments are contemplated in which the visual indicator 58 comprises one or more LEDs configured to produce a green light to indicate an attached state of the lanyard attachment assembly 40 and to produce a red light to indicate an unattached state of the lanyard attachment assembly 40.

In some embodiments, the controller 36 may be mounted onto a portion of the utility platform 20. For example, the controller 36 may be mounted onto an external or internal surface of the platform wall 22 such that audible and visual indications are provided at the utility platform 20. Alternatively, or additionally, embodiments are contemplated in which the audible indicator 56 and the visual indicator 58 are included on a physically separate structure from the controller 36. For example, the audible indicator 56 and the visual indicator 58 may be mounted to another portion of the utility platform 20 and may be communicatively coupled to the controller 36. Further, embodiments are contemplated in which additional indicator devices are disposed elsewhere on the boom assembly 14. For example, one or more visual or audible indicators may be disposed on the utility vehicle 12 or at ground level such that operators within the utility platform 20 and at ground level may be alerted simultaneously.

In some embodiments, the controller 36 may be communicatively coupled to one or more other control devices. For example, in some embodiments, the controller 36 is communicatively coupled to a telematics system or control system of the utility vehicle 12 such that bidirectional or single-directional communication is provided with the utility vehicle 12. As such, embodiments are contemplated in which one or more alerts may be transmitted to the utility vehicle 12 and may be generated, for example, within the vehicle cab or another portion of the vehicle 12.

Figure 5:
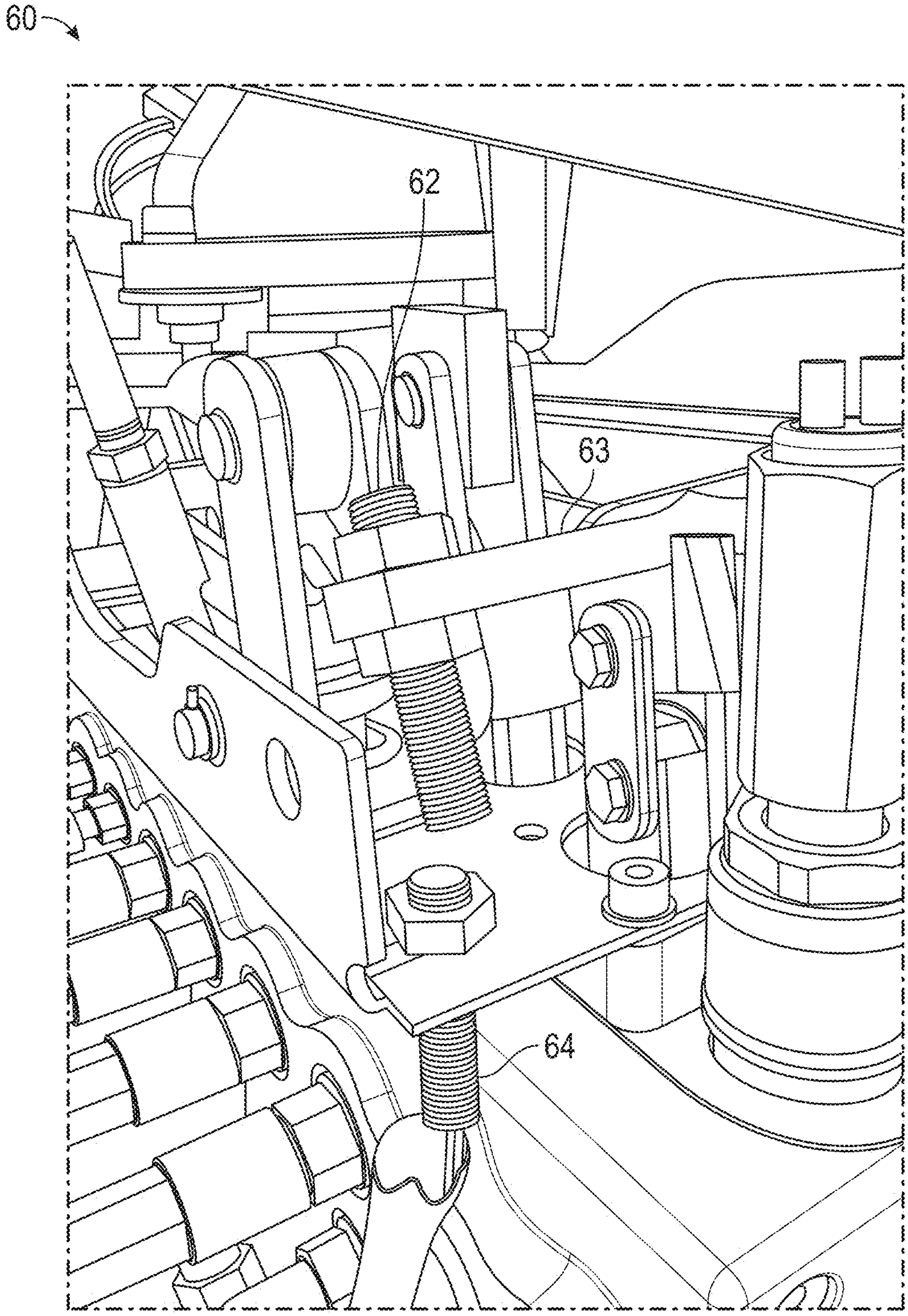
FIG. 5 illustrates an exemplary interlock sensor assembly relating to some embodiments of the present disclosure.

FIG. 5 illustrates an exemplary interlock sensor assembly 60 relating to some embodiments of the present disclosure. In some embodiments, the interlock sensor assembly 60 comprises the interlock sensor 34 described above. For example, in some embodiments, the interlock sensor assembly 60 comprises a magnetic component 62. Similar, to magnetic component 48, in some embodiments, magnetic component 62 comprises a permanent magnet or another suitable magnetically sensible element, such as, for example, an electromagnet. The magnetic component 62 may be secured to an interlock linkage 63, as shown. For example, the magnetic component 62 may be disposed through a threaded opening near an end of the interlock linkage 63. In some embodiments, the interlock linkage 63 is configured to be lowered while the control interlock of the utility platform 20 is actuated.

In some embodiments, the interlock sensor assembly 60 further comprises an interlock sensor component 64, as shown. In some embodiments, the sensor component 64 comprises a magnetically sensitive component, such as a reed switch configured to detect a presence of the magnetic component 62. For example, the sensor component 64 is configured to detect the magnetic component 62 when the interlock sensor assembly 60 is in the actuated position such that the interlock linkage 63 is lowered toward the interlock sensor component 64 and the magnetic component 62 enters a detection window of the interlock sensor component 64.

Figure 6:
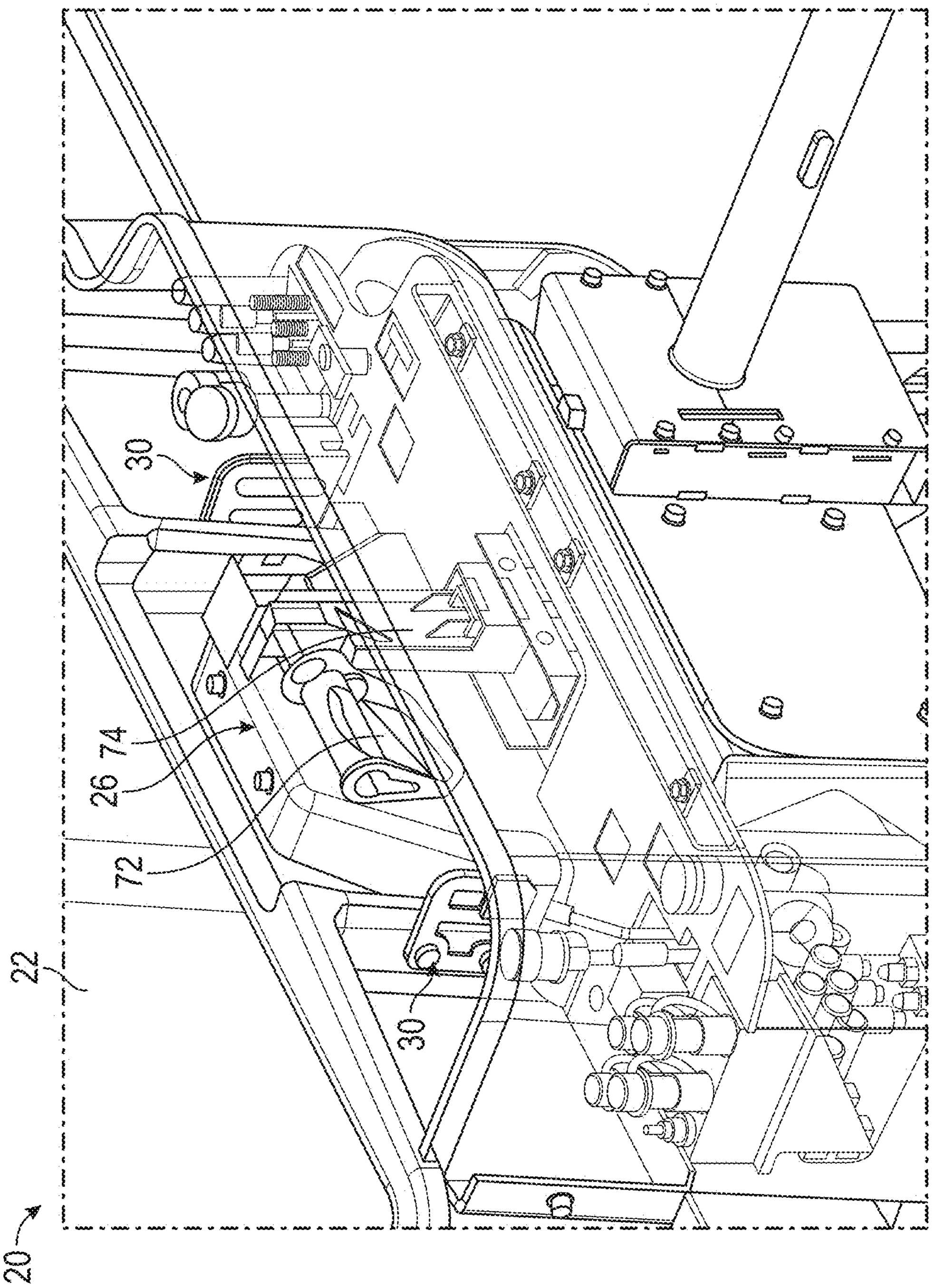
FIG. 6 illustrates an exemplary portion of the utility platform relating to some embodiments of the present disclosure.

FIG. 6 illustrates an exemplary portion of the utility platform 20 relating to some embodiments of the present disclosure. As shown, the input device 26 and one or more lanyard detection system 30 may be disposed on a portion of the utility platform 20. For example, in some embodiments, a pair of lanyard detection systems 30 are disposed on an external surface of the platform wall 22, as shown. In some such embodiments, a distinct lanyard detection system 30 is included for each operator of the utility platform 20. For example, the utility platform 20 may be configured to support a first and second operator such that the utility platform includes a first lanyard detection system for the first operator and a second lanyard detection system for the second operator.

In some embodiments, the utility platform 20 further comprises one or more sensors to detect an occupancy of the utility platform 20. For example, the occupancy sensors may be configured to detect a number of operators within the utility platform 20, an overall load of the utility platform 20, or whether the utility platform 20 is occupied or not occupied. For example, in some embodiments, the utility platform 20 may include a force sensor, such as, a pressure sensor, a strain gauge, or another force sensor for detecting an occupancy condition of the utility platform 20.

In some embodiments, the input device 26 comprises a handle 72 disposed at a distal end of a lever structure 74 of the input device 26. As described above, in some embodiments, the input device 26 has insulating properties. For example, the input device 26 and components thereof may comprise an insulating material configured to prevent current flow through the input device 26. In some embodiments, the input device 26 is electrically insulated to preserve a dielectric gap associated with the boom assembly 14. For example, a dielectric gap may be created between an upper portion of the boom assembly 14, including the utility platform 20 and components mounted thereon, and the lower portion of the boom assembly 14 to prevent electrical current from flowing to a grounded portion of the boom assembly 14.

In some embodiments, at least a portion of the components described herein may be operated at a bonded on state. For example, in some cases, at least a portion of the utility platform 20 may be electrically bonded to an energized power line such that said portions of the utility platform 20 are held at a similar electrical potential as the energized power line. Accordingly, said utility platform components, such as the input device 26, and the lanyard detection system 30 may be electrically insulated from grounded components at the base of the boom assembly 14. Further, electrical components of the utility platform 20 may be powered by a topside power source such as the power source 39, as described above, disposed at the utility platform 20.

In some embodiments, other forms of input devices are contemplated. For example, the input device 26 may comprise any of a control stick, a button layout, a gaming controller, a mouse, a keyboard, a control lever, or combinations thereof. Further, in some embodiments, remote input devices are contemplated. For example, at least one operation of the boom assembly 14 and/or the utility platform 20 may be performed in response to a remote input from a remote input device that is remote from the operating environment.

Figure 7:
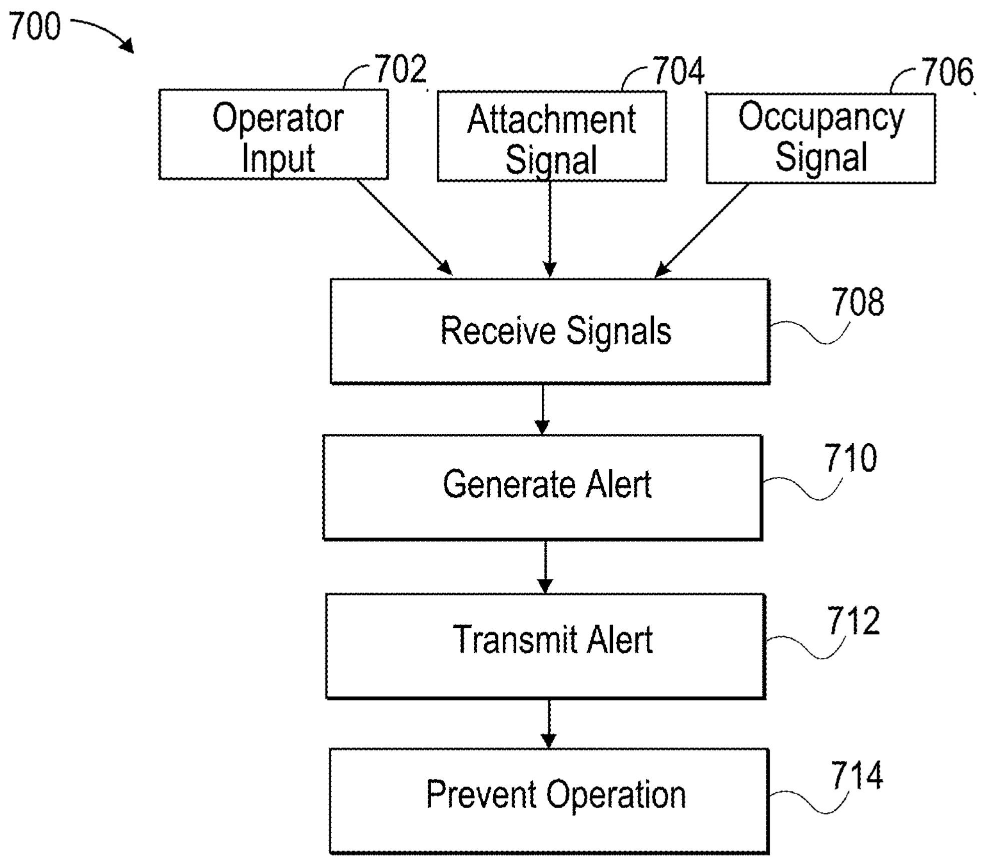
FIG. 7 illustrates an exemplary method of lanyard detection relating to some embodiments of the present disclosure.

FIG. 7 illustrates an exemplary method 700 of lanyard detection relating to some embodiments of the present disclosure. In some embodiments, at least a portion of the steps of method 700 are performed by the controller 36. For example, in some embodiments, the method 700 or a portion thereof is performed by executing computer-readable and executable instructions stored on one or more non-transitory computer-readable media. Additionally, or alternatively, embodiments are contemplated in which one or more steps are performed by another controller or processor. For example, in some embodiments, steps are performed using a controller associated with the utility vehicle 12 or by a remote control device that is remote to the utility platform operation.

In some embodiments, any combination of an operator input 702, an attachment signal 704, and an occupancy signal 706 are received at step 708. In some such embodiments, the operator input 702, the attachment signal 704, and the occupancy signal 706 are received by the controller 36. The operator input 702, for example, may include an input received from a human operator within the utility platform 20 via the input device 26. In some embodiments, the operator input 702 comprises a motion request from an operator requesting motion of the utility platform 20 and or another portion of the boom assembly 14. For example, the input may request that the boom assembly 14 be moved upwards toward a work environment. Alternatively, or additionally, in some embodiments, the operator input 702 may comprise an initial activation of the input device 26 such as an activated switch or another suitable input mechanism associated with the input device 26.

The attachment signal 704, for example, may include an indication of a lanyard attachment condition, such as a lanyard attachment condition form the lanyard detection system 30 and/or lanyard attachment assembly 40. In some embodiments, the occupancy signal 706 is received. The occupancy signal 706 may include an indication of whether an operator is present within the utility platform 20. For example, an occupancy condition may be determined based on a signal from an occupancy sensor such as a strain gauge or other weight sensor disposed on the utility platform 20. Alternatively, or additionally, in some embodiments, the occupancy condition may be inferred based on other information. For example, an occupancy may be determined based on receiving operator input 702. Further, in some embodiments, the occupancy signal 706 may include information indicative of a number of occupants or operators within the utility platform 20. For example, the occupancy signal 706 may include a number of occupants in the utility platform 20 as determined by an occupancy sensor.

At step 710, an alert is generated in response to the signals received at step 708. For example, an alert may be generated in response to receiving the operator input 702 and determining that the attachment signal 704 indicates a "no attachment" condition. Alternatively, or in addition, embodiments are contemplated in which the alert is generated in response to determining that the utility platform 20 is occupied (based on occupancy signal 706) and the absence of lanyard attachment (based on attachment signal 704). In some embodiments, different forms of alerts may be generated granularly based on the specific parameters of the received signals. For example, the alert may be generated based on the type of operator input 702 requested. As a specific example, a different alert may be generated for an initial activation input versus a motion request input.

In some embodiments, the alert may be generated based at least in part on a number of occupants in the utility platform 20 from the occupancy signal. For example, the alert may be generated responsive to determining that the number of lanyards attached is less than the number of occupants in the utility platform 20. Accordingly, embodiments are contemplated in which the lanyard attachment system is adapted to accommodate multiple operators and occupants. For example, if two occupants are present in the utility platform 20, the system may look for two corresponding lanyard attachments to ensure that a lanyard attachment is provided for each user. Here, an alert may be generated if a lanyard attachment is not sensed for each occupant.

At step 712, the alert generated at step 710 is transmitted to one or more other devices or components. For example, the alert may be transmitted to the indicator devices such as the audible indicator 56 and the visual indicator 58. The alert may be configured to cause either of the audible indicator 56 and the visual indicator 58 to be activated. Further, in some embodiments, the alert may be transmitted to a control system associated with the boom assembly 14 or vehicle 12. In some embodiments, the alert is transmitted to one or more remote devices that are disposed in a remote location from the working environment. For example, the alert may be transmitted wirelessly to a remote communication device. Further still, embodiments are contemplated in which the alert may be stored in a storage device and/or a remote storage device.

In some embodiments, activation of the audible indicator 56 and the visual indicator 58 may be adjusted granularly based on the type of alert. For example, the alert may include instructions to activate the audible indicator 56 and visual indicator 58 based on the parameters of the received signals. As a specific example, the visual indicator 58 may be configured to produce varying colored lights or light patterns based on any of the type of operator input, type of attachment signal, or type of occupancy signal. Similarly, the audible indicator 56 may be configured to produce different sounds based on any of the type of operator input, the type of attachment signal, or occupancy signal.

At step 714, at least one operation of the utility platform 20 and/or the boom assembly 14 is prevented based on the alert. For example, in some embodiments, a motion operation of the boom assembly 14 may be prevented based on the alert indicating that a lanyard device is not attached. In some embodiments, the operation may be prevented until an override is provided or until the attachment signal 704 is updated to indicate a lanyard attachment. Alternatively, embodiments are contemplated in which operations are not automatically prevented. Further, in some embodiments, steps such as operation prevention may be adjustable such that an operator is able to individually configure the operation prevention behavior based on preference. For example, an operation prevention setting may be selectively adjusted such that operations are not prevented and only one or more alerts are generated.

In some embodiments, at least one operation of the utility platform 20, such as, for example, boom movement, is prevented using the hydraulic blocking valve 35 in the platform area. The hydraulic blocking valve 35 may be operable to prevent any of a range of boom and platform movements. In some embodiments, the hydraulic blocking valve prevents any boom or platform movement responsive to lanyard signal, for example, detecting that a lanyard device is not attached. In some embodiments, the hydraulic blocking valve 35 is powered by a standalone power source, such as, for example, the power source 39. Further, the hydraulic blocking valve may be controlled using a controller associated with the platform, boom assembly, or vehicle, such as, for example, the controller 36. In some embodiments, the hydraulic blocking valve 35 is a low power hydraulic solenoid valve that blocks hydraulic flow to the hydraulic circuit associated with the utility platform and thereby disables the platform input mechanism, such as a platform joystick, to command machine motion functions. In some embodiments, the hydraulic blocking valve 35 is disposed adjacent to one or more other hydraulic valves, or adjacent to the interlock sensor 34, as shown in FIG. 2.

In some embodiments, one or more additional steps are contemplated. For example, in some embodiments, a startup routine is contemplated including a step of generating a startup alert indicative of a working condition of the lanyard attachment assembly 40 responsive to startup of, for example, the lanyard attachment assembly 40 or another system of the aerial device 10 to ensure that the lanyard detection system 30 is working and activated.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for detecting an attachment of a lanyard device at a utility platform of an aerial device, the system comprising:

an input device that receives occupant input;

a lanyard attachment assembly operable to receive the lanyard device, the lanyard attachment assembly comprising:

a moveable element comprising a magnetic component, wherein the moveable element is coupled to a compliant hinge component;

an attachment sensor comprising a magnetic sensor that detects a state of the moveable element, wherein the moveable element is in a first state when the lanyard device is not attached to the lanyard attachment assembly and the moveable element is in a second state when the lanyard device is attached to the lanyard attachment assembly, wherein the moveable element swings into an open position while the lanyard attachment assembly is in an attached state, and wherein displacement of the moveable element moves the magnetic component out of range of the magnetic sensor in the attached state; and a controller operable to perform at least one action in response to one or more signals received from the attachment sensor.

2. The system of claim 1, wherein the moveable element is operable to deflect responsive to attachment of the lanyard device to the lanyard attachment assembly.

3. The system of claim 2, wherein the attachment sensor comprises an electromagnetic sensor element.

4. The system of claim 1, wherein the at least one action performed by the controller comprises:

preventing at least one operation of the aerial device based on the one or more signals received from the attachment sensor.

5. The system of claim 1, wherein the at least one action performed by the controller comprises:

generating an alert based on the one or more signals received from the attachment sensor, the alert comprising audible feedback provided to an operator at the utility platform.

6. The system of claim 1, wherein the at least one action performed by the controller comprises:

generating an alert based on the one or more signals received from the attachment sensor, the alert comprising visual feedback provided to an operator at the utility platform.

7. A lanyard attachment assembly for detecting an attachment of a lanyard device at a utility platform of an aerial device, the lanyard attachment assembly operable to receive the lanyard device, and the lanyard attachment assembly comprising:

a controller;

a communication connection to an input device disposed on or in the utility platform that receives occupant input;

an additional communication connection to a control system of the aerial device;

a moveable element comprising a magnetic component, wherein the moveable element is coupled to a compliant hinge component;

an attachment sensor comprising a magnetic sensor that detects a state of the moveable element, wherein the moveable element is in a first state when the lanyard device is not attached to the lanyard attachment assembly and the moveable element is in a second state when the lanyard device is attached to the lanyard attachment assembly, wherein the moveable element swings into an open position while the lanyard attachment assembly is in an attached state, and wherein displacement of the moveable element moves the magnetic component out of range of the magnetic sensor in the attached state; and wherein the controller is operable to prevent one or more operations of the control system in response to one or more signals received from the attachment sensor.

8. The lanyard attachment assembly of claim 7, further comprising:

an internal power source electrically coupled to the controller and the attachment sensor.

9. The lanyard attachment assembly of claim 7, wherein the controller is operable to prevent one or more operations of the control system in response to one or more occupancy signals.

10. The lanyard attachment assembly of claim 7, wherein the controller is operable to generate an alert in response to the one or more signals received from the attachment sensor.

11. The lanyard attachment assembly of claim 10, further comprising:

an audible indication device coupled to the controller, the audible indication device operable to generate an audible alarm responsive to the alert.

12. The lanyard attachment assembly of claim 11, further comprising:

a visual indication device coupled to the controller, the visual indication device operable to generate a visual alarm responsive to the alert.

13. A system for detecting an attachment of a lanyard device at a utility platform of an aerial device, the system comprising:

an input device that receives occupant input;

a lanyard attachment assembly operable to receive the lanyard device, the lanyard attachment assembly comprising:

a moveable element comprising a magnetic component, wherein the moveable element is coupled to a compliant hinge component;

an attachment sensor comprising a magnetic sensor that detects a state of the moveable element, wherein the moveable element swings into an open position while the lanyard attachment assembly is in an attached state, wherein displacement of the moveable element moves the magnetic component out of range of the magnetic sensor in the attached state, and wherein the moveable element is in a first state when the lanyard device is not attached to the lanyard attachment assembly and the moveable element is in a second state when the lanyard device is attached to the lanyard attachment assembly; and a controller operable to:

receive the occupant input from the input device;

receive an attachment signal indicative of the attachment of the lanyard device to the lanyard attachment assembly using the attachment sensor; and generate an alert in response to at least one of the occupant input and the attachment signal.

14. The system of claim 13, wherein the controller is further operable to receive an occupancy signal indicative of an occupancy of the utility platform.

15. The system of claim 13, wherein the controller is further operable to prevent at least one operation associated with the utility platform responsive to the alert.

16. The system of claim 13, wherein the controller is further operable to respond to startup of the lanyard attachment assembly, generating a startup alert indicative of a working condition of the lanyard attachment assembly.

17. The system of claim 13, wherein the controller is further operable to transmit the alert to an audible indicator device and a visual indicator device coupled to the utility platform.

18. The system of claim 17, wherein the controller is further operable to transmit the alert wirelessly to one or more remote devices.

19. The system of claim 13, wherein the controller is further operable to receive an occupancy signal, determine a number of occupants in the utility platform based on the occupancy signal; and update the alert based at least in part on the number of occupants.

* * * * *